Dec. 4, 1956     R. A. LEVY ET AL     2,773,175
ILLUMINATED ARTIFICIAL AQUARIUM
Filed Oct. 15, 1952
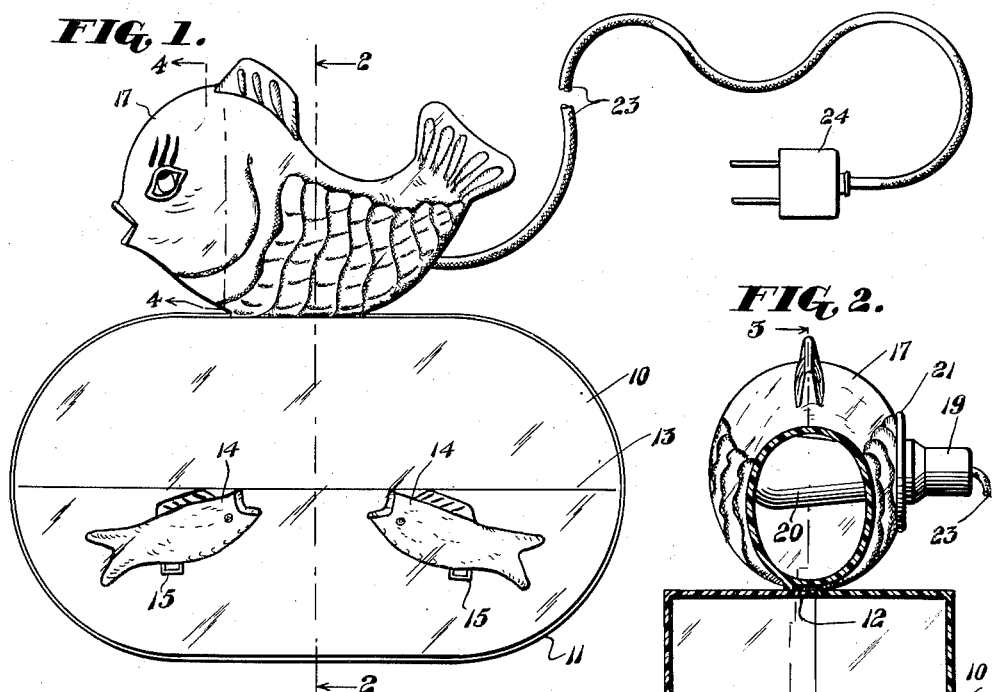
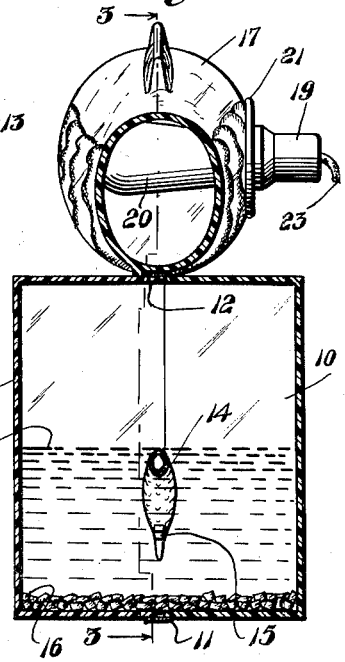
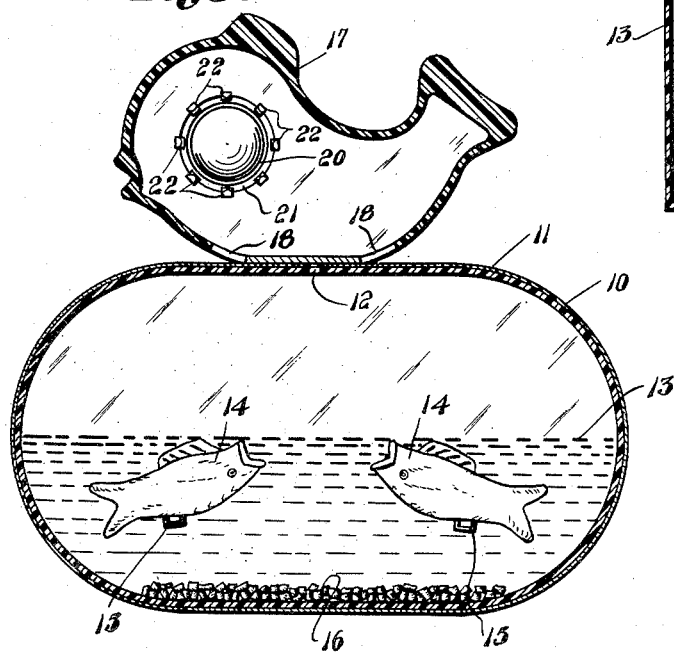
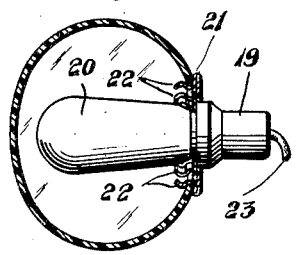
Inventors
Richard A. Levy
Charles J. Levy
By John W. Smith United States Patent Office 2,773,175
Patented Dec. 4, 1956

2,773,175

ILLUMINATED ARTIFICIAL AQUARIUM

Richard A. Levy, Philadelphia, and Charles J. Levy, Elkins Park, Pa.

Application October 15, 1952, Serial No. 314,926

3 Claims. (Cl. 240—10)

This invention relates to an illuminated artificial aquarium.

The object of the invention is to provide an illuminated artificial aquarium which will glow with an effect pleasing to the eyes when placed in a darkened room.

A further object of the invention is to provide an illuminated artificial aquarium which, while resembling a natural aquarium, is capable of providing lighting effects which are not possible with the latter.

An additional object of the invention is to provide an illuminated artificial aquarium which can be almost entirely constructed from the more recently developed plastic materials.

Still other objects, advantages, and improvements will become apparent from the following specification, taken in connection with the accompanying drawing, in which:

Figure 1 is a side elevation view of the illuminated artificial aquarium according to the present invention;

Figure 2 is a vertical sectional view of the illuminated artificial aquarium on the section line 2—2 of Figure 3;

Figure 3 is also a vertical sectional view, at right angles to that of Figure 2, on the section line 3—3 of Figure 1; and, Figure 4 is a detail sectional view on the section line 4—4 of Figure 1.

Referring now to the drawing in detail, and to Figure 3 in particular, the tank of the illuminated artificial aquarium is here shown as comprised by two mating sections 10—10, each having semi-circular ends. These sections 10, 10 are placed in edge to edge relationship. The edge of one section is slightly outstruck for a short distance along its width to provide for receiving the edge of the other section in overlapping relationship. The sections 10—10 of the tank are made of any suitable transparent material, but preferably of a transparent plastic material such as "Polystyrene." Around the joint between the edges of the tank sections 10—10 there is placed a sealing strip 11 of transparent plastic material, which is adhered to the two (2) sections by a suitable adhesive, such as "Rez-N-Bond." In the top of the tank, at the intersection of transverse and longitudinal center lines, there is formed a hole 12 which extends through the sealing strip 11, as well as the adjoining overlapping edges of the two (2) tank sections. This hole is provided for filling the tank with water. It is preferable however to only fill the tank approximately half full of water, that is to a level shown at 13.

Within the tank there are placed in the water therein two or more models of fish 14, these being formed of any suitable material, preferably a plastic material such as "Polyethylene," suitably colored. The fish would normally float on the surface of the water but they are provided with suitable metal weight members 15 on their under sides, which cause them to assume positions slightly below the surface of the water. These weight members are displaced from the center of gravity toward the tails of the fish, so that the latter assume positions with their mouths slightly below the surface of the water and their tails disposed downwardly.

On the bottom of the tank there are scattered in the water therein suitable pieces of material 16 which simulate gravel and/or fish food. These pieces may be of any desired shape, here shown as approximately cubical, and are also made of suitable plastic material, and are variously colored.

On the top of the tank there is mounted a model of a simulated miniature whale 17, made of some suitable plastic material such as "Polystyrene," but suitably colored so as to be opaque. This miniature whale is secured to the top of the tank and over the sealing strip 11 thereon by any suitable adhesive, such as "Rez-N-Bond," previously mentioned. When the miniature whale 17 is in place on top of the tank, it closes the filling opening 12 in the latter. In the under side of the miniature whale there are formed one or more openings 18 for a purpose which will appear hereinafter.

In the side of the miniature whale 17 there is formed a suitable hole against the outer edge of which there is mounted a socket 19 for a miniature or candelabra lamp bulb 20, which projects within the body of the whale. The bulb 20, while a miniature bulb, is nevertheless one which is designed for operation on ordinary 110 volt house current. Alternatively, a flash light bulb may be used in conjunction with an ordinary bell ringing transformer, if desired. The socket 19 is secured in place by a spring disc 21 having fingers 22 on its circumference which grip the edge of the hole in the body of the miniature whale. A lamp cord 23 and a plug 24 on the outer end thereof complete the assembly.

In use, when the lamp 20 is on, the entire tank 10, including the water 13, fish 14, and artificial gravel 16 therein, have a pleasing glow imparted thereto, the light rays entering the tank through the holes 18 in the under side of the body of the miniature whale 17. This glow effect is more apparent and pleasing in a room in which other sources of illumination have been extinguished, such as a darkened child's nursery or a bedroom at night.

Having now fully described our invention, what we claim as new and useful and desire to secure by Letters Patent of the United States is:

1. An illuminated artificial aquarium comprised by a tank of two mating sections of transparent material with flanges thereon adapted to be positioned in edge to edge relation and having flat surfaces adapted to form the top of the tank, a hollow opaque body simulating a fish having a flat bottom section mounted on the top of the tank, and upwardly curved sections on either side of said flat bottom section with holes therein, and a lamp within said hollow opaque body for radiating light to the tank through said holes.

2. An illuminated artificial aquarium comprised by a tank of two mating sections of transparent material with flanges thereon adapted to be positioned in edge to edge relation and having flat surfaces adapted to form the top of the tank, a sealing strip around the junction of the flanges on said two sections and adhered to the latter, a hollow opaque body simulating a fish having a flat bottom section, mounted on the abutting flat top surfaces of the tank sections, and upwardly curved sections on either side of said flat bottom section with holes therein, and a lamp within said hollow opaque body for radiating light to the tank through said holes.

3. An illuminated artificial aquarium comprised by a tank of two mating sections of transparent material rectangular in cross section having semi-circular ends and with flanges thereon adapted to be positioned in edge to edge relation and having flat surfaces adapted to form the top of the tank, a sealing strip around the junction of the flanges and adhered to the latter, a hollow opaque body simulating a fish having a flat bottom section mounted on the top of the tank, and upwardly curved sections on either side of said flat bottom section with holes therein, and a lamp within said hollow opaque body for radiating light to the tank through said holes.

References Cited in the file of this patent

UNITED STATES PATENTS

| | | |
|---|---|---|
| 1,762,634 | Jyumi | June 10, 1930 |
| 2,185,708 | Meyerricks | Jan. 2, 1940 |
| 2,433,747 | Dupler | Dec. 30, 1947 |